April 7, 1959 H. L. McNEILL 2,880,869
ORE CONCENTRATION METHOD AND APPARATUS
Filed July 27, 1953 2 Sheets-Sheet 1

INVENTOR.
Harry L. McNeill
BY
ATTORNEY

United States Patent Office 2,880,869
Patented Apr. 7, 1959

2,880,869

ORE CONCENTRATION METHOD AND APPARATUS

Harry L. McNeill, Denver, Colo.

Application July 27, 1953, Serial No. 370,560

8 Claims. (Cl. 209—159)

This invention relates to concentration methods and apparatus for ores and the like and more particularly relates to concentration practices including sink-float separations.

A practice of the present invention will be performed in apparatus of the type disclosed in my copending application, Serial No. 215,077, filed March 12, 1951, for Ore Concentration and Apparatus Therefor, now Patent No. 2,777,577 of January 15, 1957. Features disclosed but not claimed herein have been made the subject of claims in the aforesaid application.

In certain treatments of the type desired in the aforesaid application, attempts have been made to effect a fast separation or segregation of the sink and float products of the feed to reduce the circulating load of material carried through the final separation stages. More specifically, I have found that I can increase treatment capacity with improved metallurgical results by getting a more rapid discharge of float material in an action in which initial segregation of float and sink constituents is attained.

Accordingly, it is an object of this invention to provide a simple, efficient and economical method of effecting a rapid discharge of float constituents in sink and float separations. Another object of the invention is to provide a simple, durable and efficient control of the float product discharge in sink and float concentrators. A further object of the present invention is to provide an improved distribution of incoming feed in apparatus for performing sink and float separations. Other objects reside in novel details of construction and novel combinations and arrangements of parts all of which will be set forth in the course of the following description.

The present invention is based on the discovery that by introducing air or other aerating gas at selected pressures in high velocity streams adjacent a float product overflow in a sink and float separator, the float product content of the entering feed will be segregated to a considerable extent in the overflow zone and thus passed directly from the treatment while substantially all sink product and only a portion of the entering float product passes onto or into a body of media performing the main separation of the treatment. As a consequence, the circulating float product is materially reduced and at the same time the entering sink product is passed through a zone of less impedance to permit a more rapid assumption of its natural settling tendencies.

A practice of the invention will be best understood by reference to the accompanying drawings. In the drawings in the several views of which like parts have been designated similarly;

Figure 1:
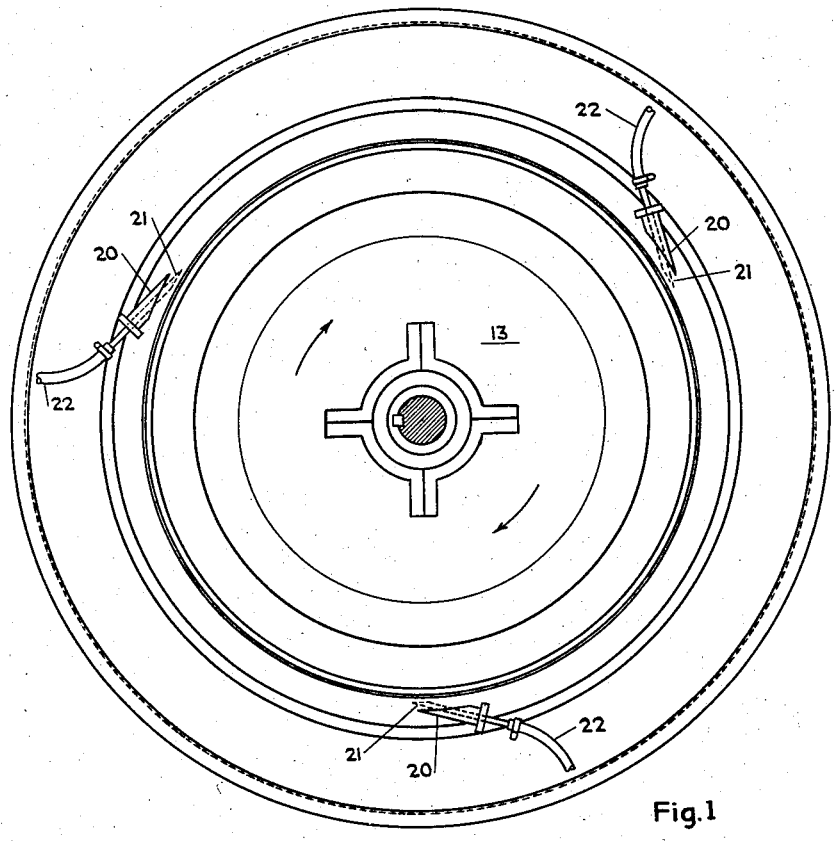
Fig. 1 is a top plan view of the primary separation stage of a "selected media separator" of the general type disclosed and claimed in my copending application and embodying features of the present invention.
Figure 2:
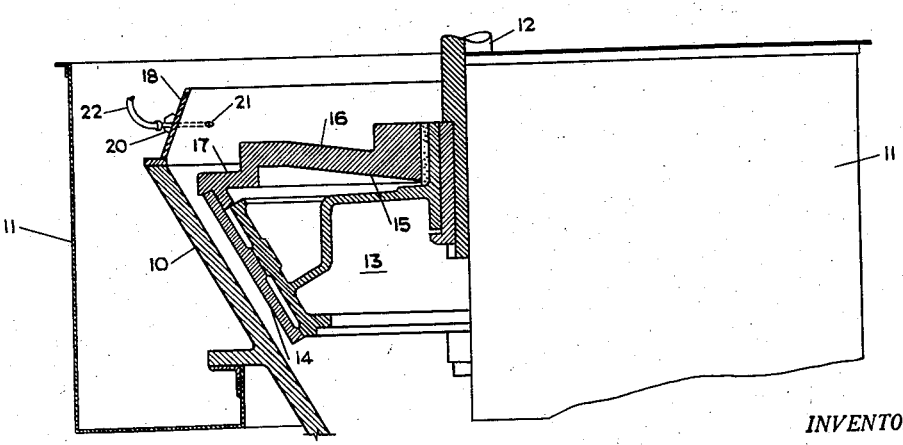
Fig. 2 is a side elevation view of the separator of Fig. 1 with the left half shown in section along the center line.

Referring now to the drawings, the general arrangement of the rotary concentrator illustrated in Figs. 1 and 2 is essentially the same as that disclosed in the above-mentioned application. The concentrator comprises a heavy inverted frusto-conical tank 10 mounted within a cylindrical overflow tank 11. Within the tank 10 and mounted at the lower end of a rotatable shaft 12 is a massive impeller 13 having an imperforate frusto-conical outer surface 14 which is disposed in parallel relationship with the inner surface of the tank 10. Rotor 13 is provided with a top plate 15 in the form of a heavy disk constituting a pulp distributing plate and having a dished portion 16 terminating outwardly in a step or shoulder 17 at the periphery of the rotor 13. This rotary concentrator is operated in essentially the same manner as that of the above-mentioned copending application and the impeller 13 may be adjusted axially in order to vary the spacing between the impeller and the walls of the tank 10. At the top of the wall of the tank 10 there is provided an overflow weir 18 of frusto-conical form and during the operation of the concentrator when the impeller 13 is being rotated there is formed in the area generally between the step 17 and the weir 18 an annular separation zone through which the float product passes upwardly and finally overflows the weir 18 to fall into the overflow tank 11. The pulp feed for the concentrator is supplied to the center area of the distributor 15 from a suitable source (not shown) and is distributed under the effect of centrifugal force so that it flows outwardly over the surface 16 to the periphery of the distributor about the shoulders 17 where it enters the separator zone. Water or a suitable solution is supplied to the lower portion of the tank 10 and flows upwardly while the pulp flows outwardly and the heavier constituents thereof move downwardly through the space between the tank 10 and impeller 14 and build up a heavy media body comprising the heavier sink product moving slowly downwardly over the inside walls of the tank 10 and a portion of the lighter float product moving upwardly along the sides of the impeller 14. There is a substantial separation of float product from sink product in the annular zone within the weir 18. Moreover, it has been found in the operation of these concentrators that occasionally some coarse sink product is carried over the weir with the float product in the overflow. In order to facilitate the separation of sink product from float product within the annular separation zone and thereby to increase the efficiency of the concentrator by reducing the amount of sink product carried with the overflow, jets of gas are discharged into the annular separation zone at a plurality of points about the inner periphery of the weir. In the arrangement illustrated three nozzle assemblies 20 are shown equally spaced about the weir 18 and entering the separation zone about midway of the top and bottom of the weir. The assemblies 20 include nozzles 21 which are directed substantially tangentially of the weir 18 and in a direction substantially parallel to the top edge of the weir. The impeller 13 is rotated in a clockwise direction as viewed in Fig. 1 as indicated by the arrows. Thus it is apparent that the nozzles 21 have been positioned to direct jets of gas or other fluid in the same direction as that in which the material in the annular zone is moving. The gas under pressure for the nozzles is supplied through flexible conduits 22 and the pressure is regulated so that the jet of gas discharged into the annular zone moves at a velocity sufficiently high to increase the average velocity of the media moving in the zone under the influence of the rotating impeller 13. It will thus be apparent that the media in the separation zone is subjected periodically to the streams of gas so that bubbles of gas rise through the media and lower the specific gravity thereof in the vicinity of each of the nozzles 21. It has been observed that as the media move through the separation zone larger particles of the float product which do not rise in the areas intermediate the nozzles are affected by the passage of the air through the media and rise and are discharged with the overflow. The effect of the discharge of gas in high velocity streams is to increase the differential movement of the sink and float products. The separation medium thus formed in the annular zone is lively and quick, it is low in viscosity and it is highly selective. It has been found, for example, that the separation accomplished by operation of this gas jet concentrator may result in tailings which are of the order of 83% float product and only 17% sink product. It has been observed that very effective separation of the finer particles of sink product from the float product is accomplished within the annular separation zone. Another effect of the increased velocity secured by operation of the jets of gas is that there is a more even distribution of the pulp entering the annular separation zone from the distributor 15.

Figure 4:
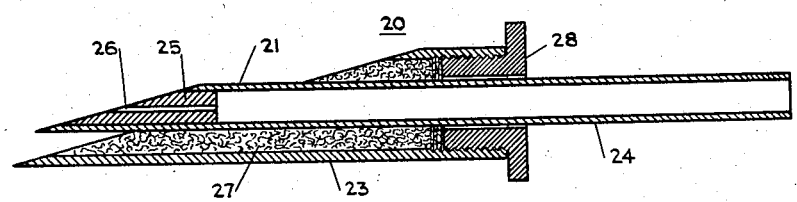
Fig. 4 is an enlarged longitudinal section view of one of the gas nozzle assemblies.

The details of construction of the nozzle assemblies 20 are shown in Fig. 4. Each assembly comprises a fitting 23 tapered to conform to the outer surface of the weir 18 and which is welded or otherwise suitably secured to the outer wall of the weir. The nozzle 21 comprises a tube 24 having a plug 25 fitted in the end thereof and provided with a bore 26 of the desired diameter to secure the high velocity jet of gas. The inner end of the tube 24 and plug 25 are tapered or beveled to fit the contour of the inner wall of the weir 18 so that the jet discharged through the duct 26 is directed in a substantially tangential path along the separation zone formed within the weir. In order to provide a suitable seal about the tube 24, a mass of packing material 27 is pressed about the tube 24 within the fitting 23 and a bushing 28 which is threaded to the inner wall of the tube 23 is screwed into place to compress the packing 27 and provide an effective seal about the tube 24. The tube 24 may readily be removed by removing the bushing 28 and drawing the tube out of its position within the tube 23.

Figure 3:
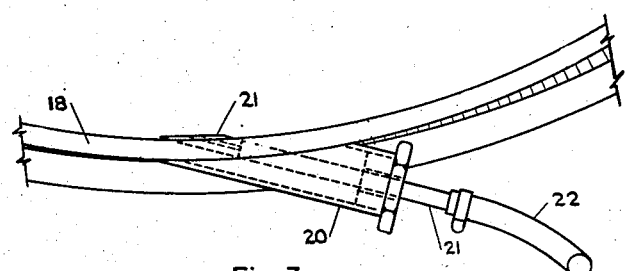
Fig. 3 is an enlarged detail view of a portion of the conical overflow weir in alignment with the inner surface adjacent one of the gas ports.
Figure 5:
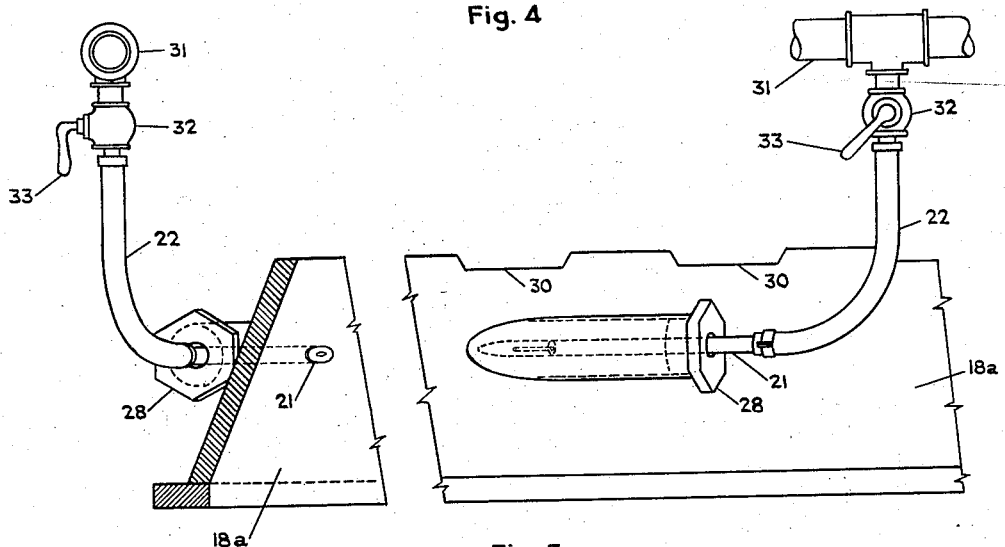
Fig. 5 is an enlarged side elevation view of a modified form of weir partly broken away and partly in section illustrating the arrangement for connecting the gas jets to a source of gas.

In Fig. 5 there is illustrated a slightly modified form of weir indicated at 18a, the top of the weir being provided with a plurality of recesses 30 to provide a lower overflow passage for large particles of float product in the manner set forth in the above-mentioned copending application. The weir 18a is otherwise the same as the weir 18 shown in Figs. 1 through 3 inclusive, and illustrates the manner in which gas under pressure from a supply line 31 is delivered to the flexible tubes 22 under control of valves 32 which may be set to secure any desired pressure and velocity of the jet of gas within the range of pressures available. The opening of the nozzles 21 into the separation zone intermediate the top and bottom of the weir is clearly shown in this figure.

This invention thus provides a new method for treating the media in the annular separation zone of rotary concentrators of the type above set forth. By discharging jets of gas at a high velocity in the direction of rotation of the media moving about the annular separation zone, a very selective froth or bubble zone is produced and the separation of sink product from float product is greatly facilitated. Furthermore, coarse particles of float product which are not moving sufficiently rapidly to be freely suspended are picked up as they pass through the zones adjacent the jets of gas and this periodic bombardment by a multitude of bubbles in the gas stream causes them to be carried over the weir and discharged with the overflow.

A further increase in the effectiveness of the separation of sink product from float product in the separation zone may be accomplished by introducing separation reagents with the gas discharged through the nozzles 21. It is thus apparent that the reagent may be introduced at the most active portion of the annular separation zone where it will be most effective.

During the operation of the rotary concentrator, after the bed of media has been built up between the rotor walls 14 and the inner walls of the tank 10 and the separation zone has been established within the weir 18, valves 32 are opened and the gas jets are established. The valves 32 are adjusted by handles 33 which are positioned to give the desired velocity of the gas stream. The velocity of the gas jets is adjusted so that it is greater than the velocity of the media moving through the annular zone and the gas thus serves to increase the average velocity of media flowing in the zone. There is a marked increase in the differential velocities of the float and sink product.

In the foregoing it is apparent that this invention provides a simple and efficient control of the float product discharged with the overflow from the annular separation zone. Furthermore, the control is easily adjusted and easily maintained in operation. In addition the marked improvement in the distribution of the pulp fed into the concentrator over the distributor disk further increases the effectiveness of the apparatus.

While the invention has been described in connection with a specific form of rotary concentrator, other applications will be apparent to those skilled in the art. Therefore, it is desired that the invention be not limited to the particular constructions illustrated and described and it is intended by the appended claims to cover all modifications within the spirit and scope of the invention.

I claim:

1. In a rotary concentrator of the sink-float type having an upper annular separation zone adjacent the overflow area thereof in which a pulp is circulated under centrifugal influence, the method of facilitating separation of sink product from float product within said zone which comprises changing the pulp density and increasing its velocity of movement by introducing at least one stream of gas into the circulating pulp below and adjacent its surface in the direction of its flow.

2. In a rotary concentrator of the sink-float type having an annular separation zone in the uppermost portion thereof adjacent the overflow and a rotary impeller for circulating media around the zone under centrifugal influence, the method of facilitating the separation of sink product from float product in the annular zone by introducing a gaseous stream containing a separation reagent into the zone adjacent to and below the overflow level and directing the stream substantially tangentially to and in the direction of rotation of the impeller in finely dispersed condition at a velocity sufficient to increase the average velocity of rotation and differential movement of products in the annular zone.

3. In a rotary concentrator of the type having a tank for pulp providing a lower discharge zone for sink product, an upper discharge zone having an overflow for float product and an intermediate annular zone for separating feed material according to sink and float characteristics of its constituents, and having a massive impeller disposed in the tank for rotation about a vertical axis with a peripheral surface in close proximity to inner surfaces of the tank in the intermediate zone and arranged to subject the pulp in each of the zones to a substantial centrifugal movement, the improvement which comprises at least one fluid injecting nozzle positioned on the periphery of the tank adjacent to and below the overflow of the upper discharge zone, said nozzle being directed so as to discharge fluid substantially tangentially to and in the direction of rotation of the said impeller for changing the pulp density in the upper zone so as to accelerate separation of sink and float constituents moving under the centrifugal influence in the upper zone and to accelerate discharge of float from the upper zone.

4. In a rotary concentrator of the type having a tank for pulp providing a lower discharge zone for sink product, an upper discharge zone having an overflow for float product and an intermediate annular zone for separating feed material according to sink and float characteristics of its constituents and having a massive impeller disposed in the tank for rotation about a vertical axis with a peripheral surface in close proximity to the inner surface of the tank in the intermediate zone and arranged to subject the pulp in each of said zones to a substantial centrifugal movement, the improvement which comprises a plurality of fluid injecting nozzles mounted around the periphery of the tank adjacent to and below the overflow of the upper discharge zone, said nozzles being arranged to direct fluid substantially tangentially to and in the direction of rotation of said impeller and substantially parallel to the overflow of said upper zone for changing the pulp density in the upper discharge zone so as to accelerate separation of sink and float constituents moving under the centrifugal influence in the upper zone and to accelerate discharge of float from the upper discharge zone.

5. In a rotary concentrator of the type having a tank for pulp providing a lower discharge zone for sink product, an upper discharge zone having an overflow for float product, and an intermediate annular zone for separating feed material according to sink and float characteristics of its constituents, and having a massive impeller disposed in the tank and for rotation about a vertical axis having a peripheral surface in close proximity to the inner surface of the tank in the intermediate zone and arranged to subject the pulp in each of said zones to a substantial centrifugal movement, the improvement which comprises a plurality of nozzles arranged to discharge gas under pressure in concurrent flow with and into the pulp moving under the centrifugal influence in the upper discharge zone, said nozzles being positioned around the periphery of the tank adjacent to and below the overflow of the upper discharge zone, said nozzles being directed substantially tangentially to and in the direction of rotation of the impeller and directed substantially parallel to the overflow of the upper zone for changing the pulp density in the upper discharge zone so as to accelerate separation of sink and float constituents moving under the centrifugal influence in the upper zone and to accelerate discharge of float product from the upper zone.

6. In the ore concentration art, in which an ore pulp is continuously fed into an annular zone between a rotor and a stator, is subjected to the action of a centrifugal sorting column comprising an upcast flow of float product inwardly of said zone and a downcast travel of sink product exteriorly of said upcast flow, and float product is continuously discharged by overflow at the top of said zone while sink product is discharged by a bottom structure providing a support for the material in said zone, the improvement which comprises feeding the pulp into said zone near the inner portion thereof and below the overflow level, and discharging a plurality of jets of fluid into the pulp in centrifugal movement along lines substantially tangential to its outermost portion and adjacent to and below the pulp level so as to change the pulp density adjacent the surface and thereby facilitate separation of sink product from float product adjacent the overflow.

7. In the ore concentration art, in which an ore pulp is continuously fed into an annular zone between a rotor and a stator, is subjected to the action of a centrifugal sorting column comprising an upcast flow of float product inwardly of said zone and a downcast travel of sink product exteriorly of said upcast flow, and float product is continuously discharged by overflow at the top of said zone while sink product is discharged by a bottom structure providing a support for the material in said zone, the improvement which comprises feeding the pulp into said zone near the inner portion thereof and below the overflow level, and discharging a plurality of jets of fluid into the pulp in centrifugal movement along lines substantially tangential to its outermost portion and adjacent to and below the pulp level, said discharge being at a velocity sufficient to increase the average velocity of said centrifugal movement and thereby facilitate separation of sink product from float product adjacent the overflow.

8. In the ore concentration art, in which an ore pulp is continuously fed into an annular zone between a rotor and a stator, is subjected to the action of a centrifugal sorting column comprising an upcast flow of float product inwardly of said zone and a downcast travel of sink product exteriorly of said upcast flow, and float product is continuously discharged by overflow at the top of said zone while sink product is discharged by a bottom structure providing a support for the material in said zone, the improvement which comprises feeding the pulp into said zone near the inner portion thereof and below the overflow level, and discharging a plurality of jets of fluid into the pulp in centrifugal movement along lines substantially tangential to its outermost portion and adjacent to and below the pulp level, said discharge being at a velocity sufficient to decrease the specific gravity of the material in centrifugal movement so as to facilitate separation of sink product from float product adjacent the overflow.

References Cited in the file of this patent

UNITED STATES PATENTS

| | | |
|---|---|---|
| 1,328,456 | Ross | Jan. 20, 1920 |
| 2,369,401 | Morash | Feb. 13, 1945 |
| 2,552,378 | McNeill | May 8, 1951 |